UNITED STATES PATENT OFFICE.

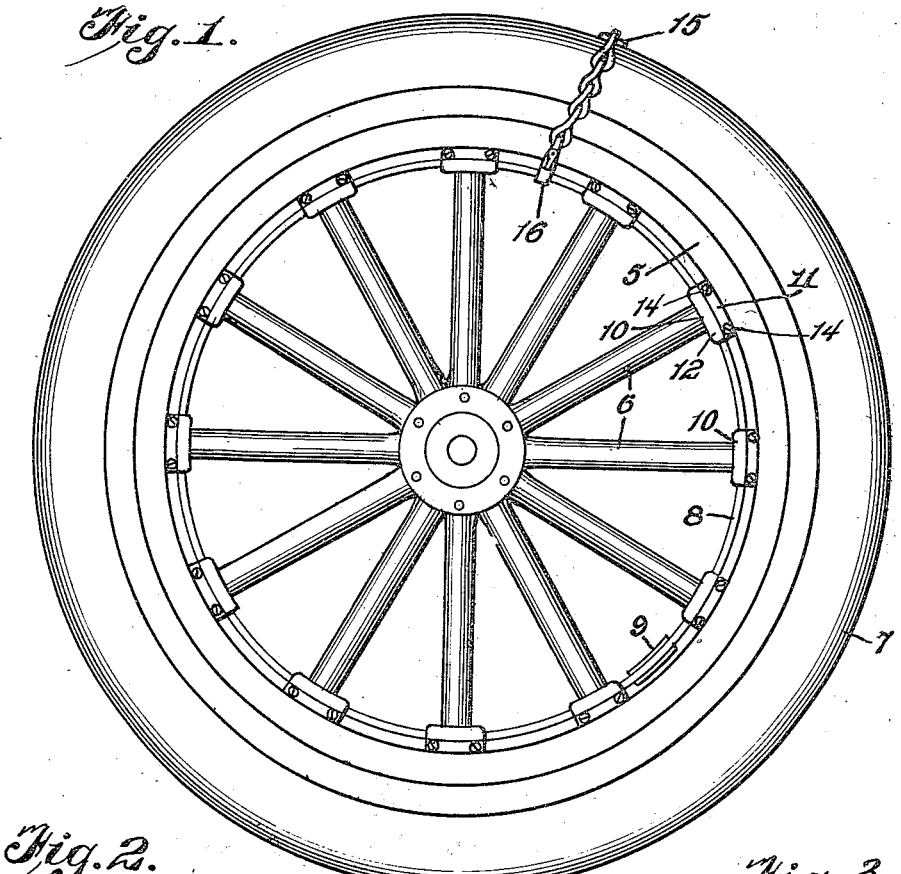
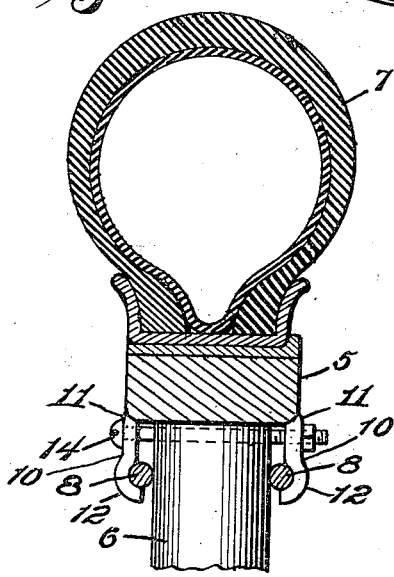
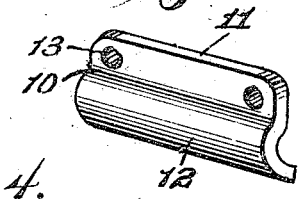
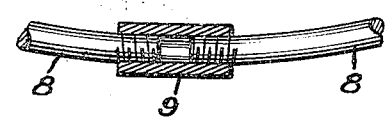

THOMAS F. MULCAHEY, OF COLFAX, ILLINOIS.

ATTACHMENT FOR MOTOR-VEHICLE WHEELS.

1,426,208.       Specification of Letters Patent.    Patented Aug. 15, 1922.

Application filed February 23, 1922. Serial No. 538,701.

*To all whom it may concern:*

Be it known that I, THOMAS F. MULCAHEY, a citizen of the United States, residing at Colfax, in the county of McLean and State of Illinois, have invented new and useful Improvements in Attachments for Motor-Vehicle Wheels, of which the following is a specification.

This invention relates generally to attachments for the wheels of motor vehicles, and particularly to means for maintaining anti-slip devices upon the said wheels.

The primary object of the invention is to provide means whereby anti-skid chains or mud hooks may be readily and easily applied to or removed from the wheel of the vehicle regardless of whether the wheel may be immersed in a mud hole or upon firm ground, and wherein the trouble and labor incident to the application of the now generally used tires and mud hooks to a wheel is entirely dispensed with.

A further object of the invention is to provide means of the character and for the purpose stated, by the use of which the strains incident to the engagement of the anti-slip device with the ground will be transmitted wholly to the parts of the wheel most able to withstand such pressures, and whereby danger of injury to the tire incident to the use of such anti-skid devices is almost entirely eliminated.

With these and other objects in view, the invention consists of the features of construction, combination and arrangement of parts, hereinafter fully described and claimed, reference being had to the accompanying drawing, in which:—

Figure 1 is an elevation of a wheel of conventional form and illustrating as applied thereto my improved means for applying an anti-slip chain thereto, Figure 2 is a transverse sectional view, on a slightly enlarged scale, through the tire and rim of the wheel and illustrating the means in which the chain engaging rims are attached to the wheel, Figure 3 is a detail perspective view of one of the clamp irons, and Figure 4 is a sectional view illustrating the manner in which the rim ends are secured together.

Referring now more particularly to the drawing, 5 indicates generally the felly of the vehicle wheel and 6 the spokes thereof. In the present instance the wheel is shown as being of that type wherein a pneumatic tire 7 is employed, however, it will be understood that the invention may equally as well be carried out with solid or cushion tire wheels.

Arranged upon the inner and outer sides of the wheel and against the spokes thereof are rings, rims or bends indicated at 8, the latter being disposed concentrically with the rim 5 of the wheel and of slightly less diameter than the same. One of the bands or rings 8 is arranged upon each side of the wheel, and these bands are preferably of the same diameter. The bands may be formed of any suitable metal of sufficient strength to withstand the strains to which the mud grip devices must necessarily be subjected in use, and these rings or bands may be made of one piece of metal or may be of the open ring type and provided at their adjacent ends with means for coupling the same together. In the present instance, the extremities of the open rings are threaded as shown in Figure 4, and an internally threaded coupling sleeve 9 is employed to connect these ends together.

The bands or rings 8 are firmly held to the wheel by means of clamp irons indicated at 10. These clamp members provide base portions 11 and ring engaging portions 12, and the base portions 11 are provided with apertures 13 through which bolts 14 are to be extended in attaching the clamp irons to the wheel. These clamp irons will be arranged in pairs; a pair for each spoke of the wheel, and the irons of each pair are disposed one upon each side of the adjacent spoke. The bolts 14 extend from one clamp iron to the other of each pair and when the nuts are tightened upon said bolts the said irons will be drawn toward each other so as to cause the rings held in the portions 12 thereof to be bound firmly against the spokes 6. The base portions 11 of the clamp irons rest firmly upon the felly 5 of the wheel, so that any strain imparted to the rings 8 will be borne almost entirely by the said felly.

The anti-skid devices used in the present instance comprise relatively short lengths of chain 15, sufficiently long to pass around the tire transversely, and the extremities of these chain lengths may be provided with fastening devices of a simple nature, such as snap hooks indicated at 16.

In practice, the drive wheels of the vehicle are provided each with a pair of the rings or chains 8 in the manner above described, and it will be understood that when the various clamp irons are properly attached as above-specified, these rings will be rigidly held to the wheel. It is intended that these rings be at all times maintained upon the wheel. Should it be required to apply anti-skid devices to the wheel, they are applied to the tire thereof with the ends firmly secured to the said rings 8. Any number of these grip members or chains may be applied to the wheel, as will be understood.

In instances where the wheel of the vehicle is buried in a mud hole or rut in the road and it is desired to apply the anti-skid devices thereto, this application may be quickly made by applying the chains to that part of the wheel which is exposed, and after the wheel has been turned, that part previously buried beneath the surface will be exposed and the grip members may be then applied thereto.

It is apparent that by this method the trouble and labor incident to the application of the now generally used chains upon motor vehicle wheels is entirely dispensed with, and by my method the anti-skid chains or grip devices may be applied to wheels where heretofore it was impossible to employ the ordinary chains as now used.

While the above is a description of the invention in its preferred form, it is to be understood that various changes in the details of construction and arrangment may be resorted to if desired, without departing from the spirit of the invention is defined by the claim.

Having thus fully described my invention, I claim:—

In a device of the class described, a pair of rings one disposed upon each side of a wheel and against the spokes thereof, a pair of grip irons, said grip irons comprising base portions and ring engaging portions, the said base portions resting upon the felly of the wheel and adjacent the spokes thereof and one upon each side of said spokes, the ring engaging portion of each iron embracing the adjacent portion of the ring, and bolts disposed transversely of the wheel and connecting the said grip members.

In testimony whereof I affix my signature.

THOMAS F. MULCAHEY.